Oct. 12, 1948.  A. H. HEINRICH  2,451,217

SHOCK ABSORBING HAMMER

Filed April 6, 1945

INVENTOR.
AUGUST H. HEINRICH
BY
Bates, Teare, & McBean
ATTORNEYS

Patented Oct. 12, 1948

2,451,217

UNITED STATES PATENT OFFICE 2,451,217

SHOCK ABSORBING HAMMER

August H. Heinrich, Euclid, Ohio, assignor to The Auto Diesel Piston Ring Company, Cleveland, Ohio, a corporation of Ohio Application April 6, 1945, Serial No. 586,891

3 Claims. (Cl. 145—29)

This invention relates to hammers, sledges and the like, particularly those wherein the use requires the striking of a solid metal object repeatedly.

Where the head of a hammer or sledge is solid, as has been the construction most generally used, there is always present considerable rebound whenever the head strikes an object of considerable density, such as an anvil or any solid steel article as a result of which there is apt to be a shock imparted to the user that in the course of a working day adds greatly to the fatigue of the operator.

An object of the present invention is to make a hammer or sledge by means of which the tendency of the head to bounce will be practically eliminated whenever the head strikes a solid article. Additionally, the invention contemplates a construction by means of which the force necessary to accomplish the desired work is nonetheless available to the operator who uses the hammer.

I accomplish the aforesaid object by utilizing a head which is constructed with a hollow interior within which a reactionary member in the form of a mass of metal is freely movable. The movable member tends to resist the force of the rebound and thereby cushions it sufficiently to preserve all the power of the blow and yet to keep the head from bouncing from the surface which has been struck.

Figure 1:
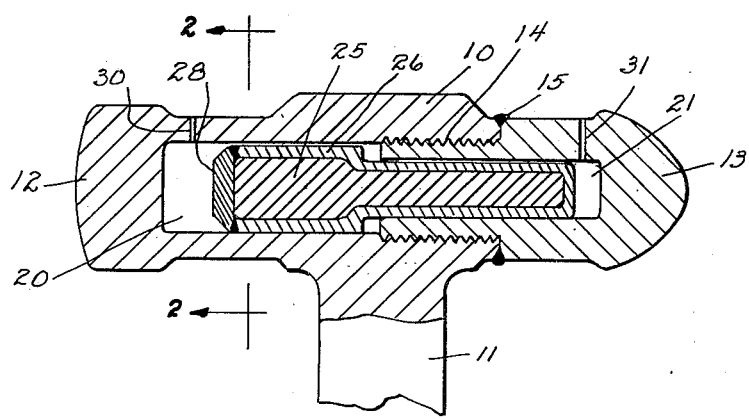
Figure 2:
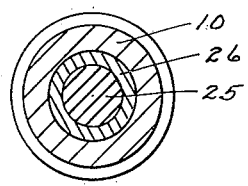

Referring now to the drawings, Fig. 1 is a sectional view through a head embodying the present invention, and Fig. 2 is a section taken on a plane indicated by the line 2—2 in Fig. 1.

The hammer illustrated in the drawings has a head indicated in general at 10 which has a handle 11, preferably formed integrally therewith. In the preferred arrangement, the head is composed of two members 12 and 13 which are connected together preferably by a threaded connection 14 and a welded joint 15. The parts 12 and 13 have bores 20 and 21 therein respectively, which are in communication when the parts are assembled and which thereby provide a hollow interior within which a mass of metal, indicated in general at 25, is free to move in a direction extending longitudinally of the head.

The member 25 constitutes a reactionary member which is adapted to slide toward the end of the hammer which strikes the working surface and thereby tends to absorb the energy of any rebound that might be apt to occur. In the preferred form the member 25 comprises a metallic casing 26 which has a clearance of approximately .005 inch around its periphery with the walls of the head members so as to permit a free sliding movement within the bores 20 and 21 respectively. The casing is filled with a dense material, such as lead, and is sealed with a cap 28. If desired, the bores may be vented by passageways 30 and 31 in the members 12 and 13 respectively, so as to minimize resistance to the movement of the member 25 within the head.

An advantage of a hammer which is made in accordance with the present invention is the fact that the tendency of the head to rebound is minimized. This is especially useful in the handling of sledges or long hammers that are used in driving railroad spikes where the rebound is apt not only to increase the element of fatigue, but is apt to be dangerous either to the user or to anyone who may be standing nearby.

I claim:

1. In a hand hammer, a handle, a hollow head comprising two members each closed across its exposed end to form a striking surface and each having a bore therein, said head extending normal to the axis of the handle and disposed at one end thereof, the members being connected together with the bores in communication and axial alignment with each other, and a weighted third member occupying the bores and being shorter in length than the combined lendth of the bores, and being freely slidable therein, and vents from the outer end portions of the respective bores.

2. In a hand hammer, a handle, a head extending normal to the axis of the handle and disposed at one end thereof, said head being composed of two members one screwing into the other, each member being integrally closed across its exposed end, to form a work striking end and each having a bore therein, the bores being in communication and axial alignment with each other the bore in the member which screws into the other having a smaller cross-sectional area than the other bore, a reaction member having a portion thereof occupying the larger bore and another portion thereof occupying the larger bore and another portion thereof occupying the smaller bore, said reaction member being freely slidable in said bores and confined within the head by the walls of said bores and there being a vent through the wall of each of said two members adjacent to the closing end thereof and leading outwardly from the corresponding bore to the atmosphere, whereby the said reaction member cooperates with either work-striking end of the hammer head to absorb the energy which tends to make the hammer rebound whenever a working surface is struck.

3. An impact tool, comprising a handle, a hollow metal head the cavity of which is closed across its opposite ends to form striking surfaces, there being vents to the exterior from the opposed ends of the cavity and a reactionary member freely slidable within the head for movement in a direction longitudinally thereof, the head extending normal to the axis of the handle and disposed at one end thereof, said member being a hollow casing containing a core of metal denser than the metal of the tool itself, so as to absorb the energy tending to make the tool rebound whenever a work surface is struck by the head.

AUGUST H. HEINRICH.

REFERENCES CITED

The following references are of record in the file of this patent:

UNITED STATES PATENTS

| Number | Name | Date |
|---|---|---|
| 604,633 | Parfitt | May 24, 1898 |
| 723,572 | Baldwin | Mar. 24, 1903 |
| 760,088 | Tonjes | May 17, 1904 |
| 913,677 | Ainsworth | Mar. 2, 1909 |
| 1,210,539 | Rudd | Jan. 2, 1917 |
| 2,193,143 | Rapien | Mar. 12, 1940 |

FOREIGN PATENTS

| Number | Country | Date |
|---|---|---|
| 59,996 | Norway | Oct. 24, 1938 |